US010231286B2

(12) United States Patent
Han et al.

(10) Patent No.: US 10,231,286 B2
(45) Date of Patent: Mar. 12, 2019

(54) METHOD AND DEVICE FOR ALLOCATING AIR INTERFACE RESOURCE

(71) Applicant: Huawei Technologies Co., Ltd., Shenzhen, Guangdong (CN)

(72) Inventors: Guanglin Han, Shenzhen (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 267 days.

(21) Appl. No.: 14/500,753

(22) Filed: Sep. 29, 2014

(65) Prior Publication Data

US 2015/0016397 A1 Jan. 15, 2015

Related U.S. Application Data

(63) Continuation of application No. PCT/CN2013/072558, filed on Mar. 14, 2013.

(30) Foreign Application Priority Data

Apr. 1, 2012 (CN) .......................... 2012 1 0095910

(51) Int. Cl.
*H04W 92/10* (2009.01)
*H04W 28/24* (2009.01)
(Continued)

(52) U.S. Cl.
CPC ........... *H04W 92/10* (2013.01); *H04W 28/18* (2013.01); *H04W 28/24* (2013.01); *H04W 72/087* (2013.01)

(58) Field of Classification Search
CPC ............. H04W 28/0278; H04W 72/04; H04W 72/048; H04W 72/10; H04W 72/1247; H04L 5/0055; H04L 5/0053
See application file for complete search history.

(56) References Cited

U.S. PATENT DOCUMENTS 7,197,557 B1 *  3/2007  Asar ................... H04L 41/5009
                                                  707/999.103
2010/0070814 A1 *  3/2010  Damnjanovic ......... H04L 1/188
                                                  714/748
(Continued)

FOREIGN PATENT DOCUMENTS

CN           101291446 A       10/2008
CN           101675693 A        3/2010
(Continued)

OTHER PUBLICATIONS

"ITU-T Recommendation H.264—Series H: Audiovisual and Multimedia Systems—Infrastructure of audiovisual services—Coding of moving video—Advance video coding for generic audiovisual services," pp. i-324, International Telecommunication Union, Geneva, Switzerland (Mar. 2005).

*Primary Examiner* — Romani Ohri (74) *Attorney, Agent, or Firm* — Leydig, Voit & Mayer, Ltd.

(57) ABSTRACT

Embodiments of the present invention provide a method and a device for allocating an air interface resource. The embodiments of the present invention are capable of solving the problem in the prior art that a method for allocating an air interface resource can provide transmission guarantee only for downlink service data on an air interface. By means of the technical solutions provided in the present invention, the end-to-end transmission guarantee between a service server and a UE can be provided for the downlink service data, thereby improving the service quality of the end-to-end transmission.

18 Claims, 2 Drawing Sheets

(51) Int. Cl.
*H04W 28/18* (2009.01)
*H04W 72/08* (2009.01)

(56) References Cited

U.S. PATENT DOCUMENTS

2010/0074230 A1     3/2010  Ishii et al.
2012/0131043 A1*    5/2012  Lee .................... G06F 17/3084
                                                            707/769
2014/0321378 A1    10/2014  Zhang et al.

FOREIGN PATENT DOCUMENTS

CN     101754267 A    6/2010
CN     102281503 A   12/2011
CN     103166995 A    6/2013

\* cited by examiner

METHOD AND DEVICE FOR ALLOCATING AIR INTERFACE RESOURCE

CROSS-REFERENCE TO RELATED APPLICATIONS

This application is a continuation of International Patent Application No. PCT/CN2013/072558, filed on Mar. 14, 2013, which claims priority to Chinese Patent Application No. 201210095910.3, filed on Apr. 1, 2012, both of which are hereby incorporated by reference in their entireties.

TECHNICAL FIELD

The present invention relates to communication technologies, and more particularly to a method and a device for allocating an air interface resource.

BACKGROUND

In a wireless communication system, such as a long term evolution (LTE) system, an evolved NodeB (eNodeB for short) can allocate air interface resources to a user equipment (UE for short) in a manner of dynamic allocation, that is, to allocate air interface resources to the UE according to a quality of service (QoS for short) parameter corresponding to downlink service data to be sent to the UE, so that the eNodeB can send the downlink service data of the UE to the UE by using the allocated air interface resources.

However, the above method for allocating air interface resources can only guarantee the transmission of the downlink service data on the air interface, but end-to-end transmission between a service server and the UE cannot be guaranteed, causing reduction in service quality of the end-to-end transmission.

SUMMARY

Embodiments of the present invention provide a method and a device for allocating an air interface resource, so as to improve the service quality of end-to-end transmission.

One aspect provides a method for allocating an air interface resource, including:

receiving, by an access network device, a service state report sent by a user equipment;

allocating, by the access network device, the air interface resource for the user equipment according to the service state report.

Another aspect provides a method for allocating an air interface resource, including:

generating, by a user equipment, a service state report;

sending, by the user equipment, the service state report to an access network device, so that the access network device allocates the air interface resource for the user equipment according to the service state report.

Another aspect provides an access network device, including:

a receiving unit, configured to receive a service state report sent by a user equipment;

an allocating unit, configured to allocate an air interface resource for the user equipment according to the service state report.

Another aspect provides a user equipment, including:

a generating unit, configured to generate a service state report;

a sending unit, configured to send the service state report to an access network device, so that the access network device allocates an air interface resource for the user equipment according to the service state report.

It can be seen from the above technical solutions that embodiments of the present invention are capable of solving the problem in the prior art that a method for allocating an air interface resource can provide transmission guarantee only for downlink service data on the air interface. By means of the technical solutions provided in the present invention, the end-to-end transmission guarantee between a service server and a UE can be provided for the downlink service data, thereby improving the service quality of the end-to-end transmission.

BRIEF DESCRIPTION OF DRAWINGS

In order to illustrate technical solutions in embodiments of the present invention or in the prior art more clearly, accompanying drawings needed for describing the embodiments or the prior art will be introduced in brief hereinafter. Apparently, the accompanying drawings show certain embodiments of the invention, and persons skilled in the art can derive other drawings from them without creative efforts.

DESCRIPTION OF EMBODIMENTS

In order to make the objects, technical solutions, and advantages of embodiments of the present invention clearer, the technical solutions in embodiments of the present invention are hereinafter described clearly and comprehensively with reference to the accompanying drawings in embodiments of the present invention. Obviously, the embodiments described here are part of embodiments of the present invention and not all of the embodiments. All other embodiments obtained by persons skilled in the art on the basis of the embodiments of the present invention without any creative efforts fall within the protection scope of the invention.

The technical solutions of the present invention may be applied to various wireless communication systems, for example, a global system for mobile communications (GSM for short) system, a general packet radio service (GPRS for short) system, a wideband code division multiple access (WCDMA for short) system, or a long term evolution (LTE for short) system, or etc.

Particularly, an access network device can be a base station controller (BSC for short) in the GSM system/GPRS system, or can be a radio network controller (RNC for short)

in the WCDMA system, or can be a network element, such as an eNodeB in the LTE system, etc.

Figure 1:
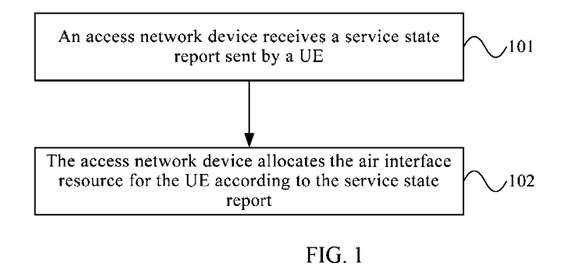
FIG. 1 is a schematic flowchart of a method for allocating an air interface resource according to an embodiment of the present invention.

FIG. 1 is a schematic flowchart of a method for allocating an air interface resource according to an embodiment of the present invention, as shown in FIG. 1, the method for allocating an air interface resource in this embodiment can include:

101, An access network device receives a service state report sent by a UE.

In an optional implementation of this embodiment, before 101, the access network device also can further generate event triggering information or sending period information of the service state report, and then the access network device can send the event triggering information or the sending period information to the UE, so that the UE can send the service state report to the access network device when a condition indicated by the event triggering information is satisfied or a period indicated by the sending period information arrives. In particular, the access network device specifically can send the event triggering information or the sending period information to the UE via a dedicated message, such as a radio resource control (RRC for short) message.

In particular, the access network device can generate the event triggering information or the sending period information of the service state report according to at least one of: a service type of a service used, being used or to be used by the UE, a transmission mechanism adopted by the service type, a service data generating manner of the service type and a QoS parameter corresponding to the service data.

For example, the access network device can receive a command including at least one of the above content, sent by a core network device. Taking the LTE system as an example, the access network device can include, but is not limited to, a mobility management entity (MME for short), a serving gateway (SGW for short), a packet data network gateway (PDN GW for short) or a policy and charging rule function (PCRF for short); the above command can include, but is not limited to, a bearer establishment message, a bearer modification message, a service establishment message, a service modification message or a control policy configuration message.

It should be noted that, the UE also can configure the event triggering information or the sending period information of the service state report according to a protocol convention.

For example, the access network device can generate the event triggering information or the sending period information of the service state report according to a service type of a service used, being used or to be used by the UE, such as a video service or a voice over Internet protocol (VoIP for short) service, etc.

For example, the access network device can generate the event triggering information or the sending period information of the service state report according to a transmission mechanism adopted by the service type of a service used, being used or to be used by the UE, such as a real-time transport protocol (RTP for short), a dynamic adaptive streaming over a hyper text transfer protocol (HTTP for short, Dynamic Adaptive Streaming over HTTP, DASH for short) or a progressive download, etc.

For example, the access network device can generate the event triggering information or the sending period information of the service state report according to a service data generating manner of the service type of a service used, being used or to be used by the UE, such as an on-demand service, a direct broadcast service, or an interactive service, etc.

For example, the access network device can generate the event triggering information or the sending period information of the service state report according to a service data QoS parameter of the service type of a service used, being used or to be used by the UE, such as a quality class identifier (QCI for short), an allocation and retention priority (ARP for short), a maximum bit rate (MBR for short) or a guaranteed bite rate (GBR for short), etc.

102, The access network device allocates the air interface resource for the UE according to the service state report.

It should be noted that, the service state report can include, but is not limited to, at least one of the following: the number of video quality conversion times, video play code rate, video play frame delay, packet loss ratio, video play frame rate, video play frame rate deviation, video play waiting time, re-buffering waiting time/the number of re-buffering waiting times, time interval between request sending and response receiving, average throughput of video service data, buffered data amount or level corresponding to the buffered data amount, buffer play time length or level corresponding to the buffer play time length, and video configuration file information.

It should be noted that, the service state report can include, but is not limited to, at least one of the following:
indication information for indicating video quality conversion event occurring;
indication information for indicating video play code rate event occurring;
indication information for indicating video play frame delay event occurring;
indication information for indicating packet loss ratio event occurring;
indication information for indicating video play frame rate event occurring;
indication information for indicating video play frame rate deviation event occurring;
indication information for indicating video play waiting event occurring;
indication information for indicating video play re-buffering event occurring;
indication information for indicating transmission delay event occurring;
indication information for indicating average throughput of video service data event occurring;
indication information for indicating buffered data amount event occurring; and
indication information for indicating buffer play time event occurring.

In an optional implementation of this embodiment, the event triggering information of the service state report can be configured as multiple forms.

For example, in order to prevent the UE from frequently converting between high video quality and low video quality during video playing, the UE can be configured to report the number of video quality conversion times during video playing. Optionally, a threshold for the number of video quality conversion times (that is, a value in a specified time range) also can be configured, when the number of video conversion times is greater than or equal to the threshold, a service state report including the number of video quality conversion times or further including indication information for indicating video quality conversion event occurring is triggered. Further, the service state report can also include at least one of an identifier of the converted video quality and a video play time for the video quality being converted to. During video playing, the UE can adjust video quality of the played video according to the measured channel bandwidth change, for example, the UE selects to play a low quality video in case the channel bandwidth is unknown, during the playing, if sensing the channel bandwidth is increased through the measurement to the channel bandwidth, the UE can select to play a higher quality video in the subsequent video playing, the higher quality video needs a higher channel bandwidth; if sensing the channel bandwidth is reduced, the UE can select to play a lower quality video segment in the subsequent video playing, thereby causing quality change of the video playing.

For another example, in order to control the video play code rate of the UE during video playing, the UE can be configured to report the video play code rate during video playing. In particular, triggering condition information for the video play code rate event can be configured to the UE, for example, at least one of a maximum value and a minimum value for the video play code rate can be configured, when the video play code rate is greater than or equal to the maximum value (or when the video play code rate is less than or equal to the minimum value), a service state report including the video play code rate or further including indication information for indicating video play code rate event occurring is triggered.

For another example, in order to control the delay during video playing, the UE can be configured to report the video play frame delay during video playing, that is the difference between an actual frame play time and a play time point under normal condition, which can be advanced time for frame playing, or delayed time for frame playing. In particular, triggering condition information for the video play frame delay event can be configured to the UE, for example, at least one of maximum advanced time and maximum delayed time for the video playing can be configured, when the actual play time is greater than or equal to the maximum advanced time (or when the actual play time is greater than or equal to the maximum delayed time), a service state report including at least one of the frame play advanced time and the frame play delayed time or further including indication information for indicating video play frame delay event occurring is triggered.

For another example, in order to control the packet loss ratio of transmission, the UE can be configured to report the case of received packet loss, i.e., to report the packet loss ratio of the received data, and the packet loss ratio can be a fame loss ratio, a bad frame ratio, a block loss ratio, a bad block ratio, a RTP packet loss ratio, a TCP retransmission ratio, an IP packet loss ratio, a packet data convergence protocol (PDCP for short) packet loss ratio, a radio link control (RLC for short) packet loss ratio, a RLC packet retransmission ratio, a hybrid auto retransmission request (HARQ) retransmission ratio or a HARQ decoding failure rate and etc. In particular, triggering condition information for the packet loss ratio event can be configured to the UE, for example, at least one of a maximum value and a minimum value for the packet loss ratio can be configured, when the packet loss ratio of the received data is greater than or equal to the maximum value (or when the packet loss ratio of the received data is less than or equal to the minimum value), a service state report including the packet loss ratio or further including indication information for indicating packet loss ratio event occurring is triggered.

For another example, in order to control the play frame rate, the UE can be configured to report the video play frame rate. In particular, triggering condition information for the video play frame rate event can be configured to the UE, for example, at least one of a maximum value and a minimum value for the video play frame rate can be configured, when the video play frame rate is greater than or equal to the maximum value (or when the video play frame rate is less than or equal to the minimum value), a service state report including the video play frame rate or further including indication information for indicating video play frame rate event occurring is triggered.

For another example, in order to control the play frame rate, the UE can be configured to report video play frame rate deviation, that is, a deviation of the video play frame rate relative to a standard normal frame rate. In particular, triggering condition information for the video play frame rate deviation event can be configured to the UE, for example, at least one of a maximum value and a minimum value for the video play frame rate deviation can be configured, when the video play frame rate deviation is greater than or equal to the maximum value (or when the video play frame rate deviation is less than or equal to the minimum value), a service state report including the video play frame rate deviation or further including indication information for indicating video play frame rate deviation event occurring is triggered.

For another example, in order to control the initial waiting time for the video playing, the UE can be configured to report video play waiting time, that is, a time delay from the beginning of the user selecting to play the video to the video playing. In particular, triggering condition information for the video play waiting event can be configured to the UE, for example, at least one of a maximum value and a minimum value for the video play waiting time can be configured, when the video play waiting time is greater than or equal to the maximum value (or when the video play waiting time is less than or equal to the minimum value), a service state report including the video play waiting time or further including indication information for indicating video play waiting event occurring is triggered.

For another example, in order to control the play interruption caused by waiting for the video data during video playing, the UE can be configured to report the video play re-buffering waiting time/the number of the video play re-buffering waiting times, that is, video play interruption time caused by waiting for the video data. In particular, triggering condition information for the re-buffering event can be configured to the UE, for example, at least one of a maximum value and a minimum value for the re-buffering waiting time can be configured, when the video play re-buffering waiting time is greater than or equal to the maximum value (or when the video play re-buffering waiting time is less than or equal to the minimum value), a service state report including the video play re-buffering waiting time or further including indication information for indicating video play re-buffering event occurring is triggered. For example, a threshold for the number of re-buffering waiting times also can be configured, when the number of video play re-buffering waiting times is greater than or equal to the threshold, a service state report including the number of video play re-buffering waiting times or further including indication information for indicating the video play re-buffering event occurring is triggered.

For another example, in order to control the video transmission delay, the UE can be configured to report the time interval between request sending and response receiving, for example, a time interval between a certain HTTP request and an HTTP response, or a time interval between a TCP request and a TCP response. In particular, triggering condition information for the transmission delay event can be configured to the UE, for example, at least one of a maximum value and a minimum value for the time interval between request sending and response receiving can be configured, when the time interval between request sending and response receiving is greater than or equal to the maximum value (or when the time interval between request sending and response receiving is less than or equal to the minimum value), a service state report including the time interval between request sending and response receiving or further including indication information for indicating transmission delay event occurring is triggered. Further, the service state report also can include request sending time and response receiving time, so as to calculate the time interval between request sending and response receiving at a network side.

For another example, in order to control the video play bandwidth, the UE can be configured to report the average throughput of video service data, which can be an IP data packet throughput, or a TCP/IP data packet or UDP/IP data packet throughput, and this embodiment is not limited thereto. In particular, triggering condition information for the average throughput of video service data event can be configured to the UE, for example, at least one of a maximum value and a minimum value for the average throughput of video service data can be configured, when the video play average throughput is greater than or equal to the maximum value (or when the video play average throughput is less than or equal to the minimum value), a service state report including the average throughput of video service data or further including indication information for indicating the average throughput of video service data event occurring is triggered.

For another example, in order to obtain buffer information, the buffer can be divided into multiple levels according to the size of buffered data amount, and the UE can be configured to report a level corresponding to the buffered data amount or can be configured to directly report the buffered data amount. In particular, triggering condition information for the buffered data amount event can be configured to the UE, for example, at least one of a maximum value and a minimum value for the buffer can be configured, when the buffered data amount or the level corresponding to the buffered data amount is greater than or equal to the maximum value (or when the buffered data amount or the level corresponding to the buffered data amount is less than or equal to the minimum value), a service state report including the buffered data amount or the level corresponding to the buffered data amount or further including indication information for indicating the buffered data amount event occurring is triggered.

For another example, in order to obtain buffer information, the buffer can be divided into multiple levels according to the buffer play time length available for the current video to be played from the beginning of the current playing time point, and the UE can be configured to report a level corresponding to the buffer play time length from the beginning of the current playing time point, or can be configured to directly report the buffer play time from the beginning of the current playing time point. In particular, triggering condition information for the buffer play time event can be configured to the UE, for example, at least one of a maximum value and a minimum value for the buffer play time range can be configured, when the buffer play time length in the video buffer or the level corresponding to the buffer play time length in the buffer is greater than or equal to the maximum value (or when the buffer play time length in the video buffer or the level corresponding to the buffer play time length in the buffer is less than or equal to the minimum value), a service state report including the buffer play time length in the video buffer or the level corresponding to the buffer play time length in the buffer or further including indication information for indicating the buffer play time event occurring is triggered.

For another example, in order to obtain more video information, the UE can be configured to report video configuration file information, such as quality information of the video to be requested or of the candidate video, required bandwidth information or video play encoding information, etc.

In an optional implementation of this embodiment, video viewing time of the user can be further divided into multiple time periods, so that the UE can respectively perform statistics on the service state information within one time period, so as to generate a service state report. Optionally, the service state report further can include time information, such as the length of the time period or starting time and ending time of the time period, etc.

In an optional implementation of this embodiment, before 101, the access network device also can further send granularity information to the user equipment, so that the user equipment can send a service state report corresponding to the granularity information to the access network device. For example, the service state report can be configured according to a granularity of a video media, that is, to report service state information of a certain video media; or can be configured according to a granularity of a video session, that is, to report service state information of the video in one video session; or can be configured according to a granularity of a bearer, that is, to report service state information of the video in one bearer.

In an optional implementation of this embodiment, if the service state report, received by the access network device, indicates that the video play re-buffering event occurs for many times, or the video play re-buffering waiting time included in the service state report is relatively long, then the access network device can allocate more air interface resources faster for the UE in the subsequent scheduling, so as to improve scheduling priority of the UE or scheduling priority of the bearer.

In an optional implementation of this embodiment, the access network device can further allocate the air interface resource for the UE in combination with a QoS parameter corresponding to the downlink service data to be sent to the UE, which can further provide the end-to-end transmission guarantee between a service server and the UE for the downlink service data. For example, if the service state report, received by the access network device, indicates that the video play re-buffering event occurs for many times, or the video play re-buffering waiting time included in the service state report is relatively long, then the access network device can allocate more air interface resources faster for the UE in the subsequent scheduling according to the QoS parameter, such as delay etc., on the premise of ensuring the service quality of the video service, so as to improve scheduling priority of the UE or scheduling priority of the bearer.

In this embodiment, the access network device receives a service state report sent by the UE, so that the access network device can allocate the air interface resource for the UE according to the service state report, and thus being capable of solving the problem in the prior art that a method for allocating an air interface resource can provide transmission guarantee only for downlink service data on the air interface. By means of the technical solutions provided in the present invention, the end-to-end transmission guarantee between a service server and a UE can be provided for the downlink service data, thereby improving the service quality of the end-to-end transmission.

Figure 2:
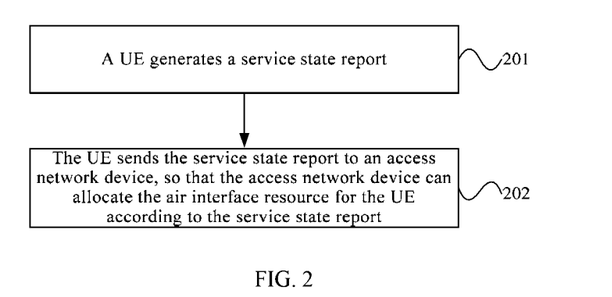
FIG. 2 is a schematic flowchart of a method for allocating an air interface resource according to another embodiment of the present invention.

FIG. 2 is a schematic flowchart of a method for allocating an air interface resource according to another embodiment of the present invention, as shown in FIG. 2, the method for allocating an air interface resource in this embodiment can include:

201, A UE generates a service state report.

202, The UE sends the service state report to an access network device, so that the access network device can allocate the air interface resource for the UE according to the service state report.

In an optional implementation of this embodiment, before 201, the UE also can further receive event triggering information or sending period information of the service state report sent by the access network device, correspondingly, in 201, the UE sends the service state report to the access network device when a condition indicated by the event triggering information is satisfied or a period indicated by the sending period information arrives. In particular, the UE specifically can receive the event triggering information or the sending period information sent by the access network device via a dedicated message, such as a radio resource control (RRC for short) message.

In particular, the access network device can generate the event triggering information or the sending period information of the service state report according to at least one of: a service type of a service used, being used or to be used by the UE, a transmission mechanism adopted by the service type, a service data generating manner of the service type and a QoS parameter corresponding to the service data. Reference for the detailed description can be made to relevant content in the embodiment corresponding to FIG. 1, which will not be repeated here.

It should be noted that, the UE also can configure the event triggering information or the sending period information of the service state report according to a protocol convention.

It should be noted that, the service state report can include, but is not limited to, at least one of the following: the number of video quality conversion times, video play code rate, video play frame delay, packet loss ratio, video play frame rate, video play frame rate deviation, video play waiting time, re-buffering waiting time/the number of re-buffering waiting times, time interval between request sending and response receiving, average throughput of video service data, buffered data amount or level corresponding to the buffered data amount, buffer play time length or level corresponding to the buffer play time length, and video configuration file information.

It should be noted that, the service state report can include, but is not limited to, at least one of the following:

indication information for indicating video quality conversion event occurring;

indication information for indicating video play code rate event occurring;

indication information for indicating video play frame delay event occurring;

indication information for indicating packet loss ratio event occurring;

indication information for indicating video play frame rate event occurring;

indication information for indicating video play frame rate deviation event occurring;

indication information for indicating video play waiting event occurring;

indication information for indicating video play re-buffering event occurring;

indication information for indicating transmission delay event occurring;

indication information for indicating average throughput of video service data event occurring;

indication information for indicating buffered data amount event occurring; and indication information for indicating buffer play time event occurring.

In an optional implementation of this embodiment, the event triggering information of the service state report can be configured as multiple forms.

For example, in order to prevent the UE from frequently converting between high video quality and low video quality during video playing, the UE can be configured to report the number of video quality conversion times during video playing. Optionally, a threshold for the number of video quality conversion times (that is, a value in a specified time range) also can be configured, when the number of video conversion times is greater than or equal to the threshold, a service state report including the number of video quality conversion times or further including indication information for indicating video quality conversion event occurring is triggered. Further, the service state report can also include at least one of an identifier of the converted video quality and a video play time for the video quality being converted to. During video playing, the UE can adjust video quality of the played video according to the measured channel bandwidth change, for example, the UE selects to play a low quality video in case the channel bandwidth is unknown, during the playing, if sensing the channel bandwidth is increased through the measurement to the channel bandwidth, the UE can select to play a higher quality video in the subsequent video playing, the higher quality video needs a higher channel bandwidth; if sensing the channel bandwidth is reduced, the UE can select to play a lower quality video segment in the subsequent video playing, thereby causing quality change of the video playing.

For another example, in order to control the video play code rate of the UE during video playing, the UE can be configured to report the video play code rate during video playing. In particular, triggering condition information for the video play code rate event can be configured to the UE, for example, at least one of a maximum value and a minimum value for the video play code rate can be configured, when the video play code rate is greater than or equal to the maximum value (or when the video play code rate is less than or equal to the minimum value), a service state report including the video play code rate or further including indication information for indicating video play code rate event occurring is triggered.

For another example, in order to control the delay during video playing, the UE can be configured to report the video play frame delay during video playing, that is the difference between an actual frame play time and a play time point under normal condition, which can be advanced time for frame playing, or delayed time for frame playing. In particular, triggering condition information for the video play frame delay event can be configured to the UE, for example, at least one of maximum advanced time and maximum delayed time for the video playing can be configured, when the actual play time is greater than or equal to the maximum advanced time (or when the actual play time is greater than or equal to the maximum delayed time), a service state report including at least one of the frame play advanced time and the frame play delayed time or further including indication information for indicating video play frame delay event occurring is triggered.

For another example, in order to control the packet loss ratio of transmission, the UE can be configured to report the case of received packet loss, i.e., to report the packet loss ratio of the received data, and the packet loss ratio can be a fame loss ratio, a bad frame ratio, a block loss ratio, a bad block ratio, a RTP packet loss ratio, a TCP retransmission ratio, an IP packet loss ratio, a packet data convergence protocol (PDCP for short) packet loss ratio, a radio link control (RLC for short) packet loss ratio, a RLC retransmission ratio, a hybrid auto retransmission request (HARQ) retransmission ratio or a HARQ decoding failure rate and etc. In particular, triggering condition information for the packet loss ratio event can be configured to the UE, for example, at least one of a maximum value and a minimum value for the packet loss ratio can be configured, when the packet loss ratio of the received data is greater than or equal to the maximum value (or when the packet loss ratio of the received data is less than or equal to the minimum value), a service state report including the packet loss ratio or further including indication information for indicating packet loss ratio event occurring is triggered.

For another example, in order to control the play frame rate, the UE can be configured to report the video play frame rate. In particular, triggering condition information for the video play frame rate event can be configured to the UE, for example, at least one of a maximum value and a minimum value for the video play frame rate can be configured, when the video play frame rate is greater than or equal to the maximum value (or when the video play frame rate is less than or equal to the minimum value), a service state report including the video play frame rate or further including indication information for indicating video play frame rate event occurring is triggered.

For another example, in order to control the play frame rate, the UE can be configured to report video play frame rate deviation, that is, a deviation of the video play frame rate relative to a standard normal frame rate. In particular, triggering condition information for the video play frame rate deviation event can be configured to the UE, for example, at least one of a maximum value and a minimum value for the video play frame rate deviation can be configured, when the video play frame rate deviation is greater than or equal to the maximum value (or when the video play frame rate deviation is less than or equal to the minimum value), a service state report including the video play frame rate deviation or further including indication information for indicating video play frame rate deviation event occurring is triggered.

For another example, in order to control the initial waiting time for the video playing, the UE can be configured to report video play waiting time, that is, a time delay from the beginning of the user selecting to play the video to the video playing. In particular, triggering condition information for the video play waiting event can be configured to the UE, for example, at least one of a maximum value and a minimum value for the video play waiting time can be configured, when the video play waiting time is greater than or equal to the maximum value (or when the video play waiting time is less than or equal to the minimum value), a service state report including the video play waiting time or further including indication information for indicating video play waiting event occurring is triggered.

For another example, in order to control the play interruption caused by waiting for the video data during video playing, the UE can be configured to report the video play re-buffering waiting time/the number of the video play re-buffering waiting times, that is, video play interruption time caused by waiting for the video data. In particular, triggering condition information for the re-buffering event can be configured to the UE, for example, at least one of a maximum value and a minimum value for the re-buffering waiting time can be configured, when the video play re-buffering waiting time is greater than or equal to the maximum value (or when the video play re-buffering waiting time is less than or equal to the minimum value), a service state report including the video play re-buffering waiting time or further including indication information for indicating video play waiting event occurring is triggered. For example, a threshold for the number of re-buffering waiting times also can be configured, when the number of video play re-buffering waiting times is greater than or equal to the threshold, a service state report including the number of video play re-buffering waiting times or further including indication information for indicating the video play re-buffering event occurring is triggered.

For another example, in order to control the video transmission delay, the UE can be configured to report the time interval between request sending and response receiving, for example, a time interval between a certain HTTP request and an HTTP response, or a time interval between a TCP request and a TCP response. In particular, triggering condition information for the transmission delay event can be configured to the UE, for example, at least one of a maximum value and a minimum value for the time interval between request sending and response receiving can be configured, when the time interval between request sending and response receiving is greater than or equal to the maximum value (or when the time interval between request sending and response receiving is less than or equal to the minimum value), a service state report including the time interval between request sending and response receiving or further including indication information for indicating transmission delay event occurring is triggered. Further, the service state report also can include request sending time and response receiving time, so as to calculate the time interval between request sending and response receiving at a network side.

For another example, in order to control the video play bandwidth, the UE can be configured to report the average throughput of video service data, which can be an IP data packet throughput, or a TCP/IP data packet or UDP/IP data packet throughput, and this embodiment is not limited thereto. In particular, triggering condition information for the average throughput of video service data event can be configured to the UE, for example, at least one of a maximum value and a minimum value for the average throughput of video service data can be configured, when the video play average throughput is greater than or equal to the maximum value (or when the video play average throughput is less than or equal to the minimum value), a service state report including the average throughput of video service data or further including indication information for indicating the average throughput of video service data event occurring is triggered.

For another example, in order to obtain buffer information, the buffer can be divided into multiple levels according to the size of buffered data amount, and the UE can be configured to report a level corresponding to the buffered data amount or can be configured to directly report the buffered data amount. In particular, triggering condition information for the buffered data amount event can be configured to the UE, for example, at least one of a maximum value and a minimum value for the buffer can be configured, when the buffered data amount or the level corresponding to the buffered data amount is greater than or equal to the maximum value (or when the buffered data amount or the level corresponding to the buffered data amount is less than or equal to the minimum value), a service state report including the buffered data amount or the level corresponding to the buffered data amount or further including indication information for indicating the buffered data amount event occurring is triggered.

For another example, in order to obtain buffer information, the buffer can be divided into multiple levels according to the size of the buffer time available for the current video to be played, and the UE can be configured to report a level corresponding to the buffer play time length, or can be configured to directly report the buffer play time. In particular, triggering condition information for the buffer play time event can be configured to the UE, for example, at least one of a maximum value and a minimum value for the buffer play time range can be configured, when the buffer play time length in the video buffer or the level corresponding to the buffer play time length in the buffer is greater than or equal to the maximum value (or when the buffer play time length in the video buffer or the level corresponding to the buffer play time length in the buffer is less than or equal to the minimum value), a service state report including the buffer play time length in the buffer or the level corresponding to the buffer play time length in the buffer or further including indication information for indicating the buffer play time event occurring is triggered.

For another example, in order to obtain more video information, the UE can be configured to report video configuration file information, such as quality information of the video to be requested or of the candidate video, required bandwidth information or video play encoding information, etc.

In an optional implementation of this embodiment, video viewing time of the user can be further divided into multiple time periods, so that the UE can respectively perform statistics on the service state information within one time period, so as to generate a service state report. Optionally, the service state report further can include time information, such as the length of the time period or starting time and ending time of the time period, etc.

In an optional implementation of this embodiment, before 201, the UE also can further receive granularity information of the service state report sent by the access network device; correspondingly, in 201, the UE specifically can generate a service state report corresponding to the granularity information. For example, the service state report can be configured according to a granularity of a video media, that is, to report service state information of a certain video media; or can be configured according to a granularity of a video session, that is, to report service state information of the video in one video session; or can be configured according to a granularity of a bearer, that is, to report service state information of the video in one bearer.

In this embodiment, the UE generates the service state report, and sends the service state report to the access network device, so that the access network device can allocate the air interface resource for the UE according to the service state report, and thus being capable of solving the problem in the prior art that a method for allocating an air interface resource can provide transmission guarantee only for downlink service data on the air interface. By means of the technical solutions provided in the present invention, the end-to-end transmission guarantee between a service server and a UE can be provided for the downlink service data, thereby improving the service quality of the end-to-end transmission.

It should be noted that, for simplicity of description, the above method embodiments are described as a combination of a series of operations, but it should be appreciated by persons skilled in the art that the order of operations described herein shall not be construed as limitation on the present invention because certain steps may occur in different order or occur simultaneously according to the present invention. Also, it should be appreciated by persons skilled in the art that the embodiments described in the specification belong to preferred options, so the associated operations and modules are not necessarily covered by the present invention.

In the foregoing embodiments, each embodiment emphasizes a specific aspect, and the part not detailed in one embodiment may be detailed in another embodiment.

Figure 3:
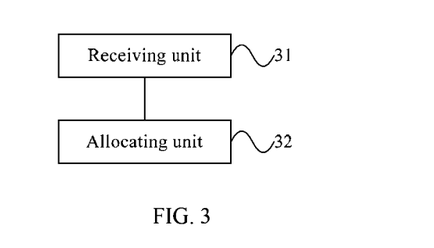
FIG. 3 is a schematic structural diagram of an access network device according to another embodiment of the present invention.

FIG. 3 is a schematic structural diagram of an access network device according to another embodiment of the present invention, as shown in FIG. 3, the access network device in this embodiment can include a receiving unit 31 and an allocating unit 32. Particularly, the receiving unit 31 is configured to receive a service state report sent by a user equipment; and the allocating unit is configured to allocate an air interface resource for the user equipment according to the service state report.

Figure 4:
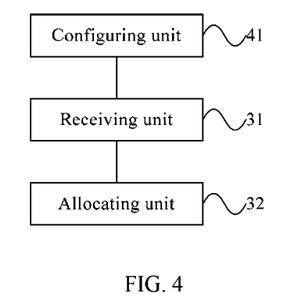
FIG. 4 is a schematic structural diagram of an access network device according to another embodiment of the present invention.

In an optional implementation of this embodiment, as shown in FIG. 4, the access network device in this embodiment also can further include a configuring unit 41, configured to generate event triggering information or sending period information of the service state report, and send the event triggering information or the sending period information to the user equipment, so that the user equipment can send the service state report to the access network device when a condition indicated by the event triggering information is satisfied or a period indicated by the sending period information arrives.

In particular, the configuring unit 41 can generate the event triggering information or the sending period information of the service state report according to at least one of: a service type of a service used, being used or to be used by the user equipment, a transmission mechanism adopted by the service type, a service data generating manner of the service type and a QoS parameter corresponding to the service data.

In an optional implementation of this embodiment, the configuring unit 41 is further configured to generate granularity information of the service state report, and send the granularity information to the user equipment, so that the user equipment can send a service state report corresponding to the granularity information to the access network device. For example, the service state report can be configured according to a granularity of a video media, that is, to report service state information of a certain video media; or can be configured according to a granularity of a video session, that is, to report service state information of the video in one video session; or can be configured according to a granularity of a bearer, that is, to report service state information of the video in one bearer.

It should be noted that, the service state report can include, but is not limited to, at least one of the following: the number of video quality conversion times, video play code rate, video play frame delay, packet loss ratio, video play frame rate, video play frame rate deviation, video play waiting time, re-buffering waiting time/the number of re-buffering waiting times, time interval between request sending and response receiving, average throughput of video service data, buffered data amount or level corresponding to the buffered data amount, buffer play time length or level corresponding to the buffer play time length, and video configuration file information.

It should be noted that, the service state report can include, but is not limited to, at least one of the following:

indication information for indicating video quality conversion event occurring;

indication information for indicating video play code rate event occurring;

indication information for indicating video play frame delay event occurring;

indication information for indicating packet loss ratio event occurring;

indication information for indicating video play frame rate event occurring;

indication information for indicating video play frame rate deviation event occurring;

indication information for indicating video play waiting event occurring;

indication information for indicating video play re-buffering event occurring;

indication information for indicating transmission delay event occurring;

indication information for indicating average throughput of video service data event occurring;

indication information for indicating buffered data amount event occurring; and indication information for indicating buffer play time event occurring.

In an optional implementation of this embodiment, the event triggering information of the service state report can be configured as multiple forms, and reference for the detailed description can be made to relevant content in the embodiments corresponding to FIG. 1 and FIG. 2, which will not be repeated here.

In an optional implementation of this embodiment, video viewing time of the user can be further divided into multiple time periods, so that the UE can respectively perform statistics on the service state information within one time period, so as to generate a service state report. Optionally, the service state report further can include time information, such as the length of the time period or starting time and ending time of the time period, etc.

In this embodiment, the access network device receives the service state report sent by the UE via the receiving unit, so that the allocating unit can allocate the air interface resource for the UE according to the service state report, and thus being capable of solving the problem in the prior art that a method for allocating an air interface resource can provide transmission guarantee only for downlink service data on the air interface. By means of the technical solutions provided in the present invention, the end-to-end transmission guarantee between a service server and a UE can be provided for the downlink service data, thereby improving the service quality of the end-to-end transmission.

Figure 5:
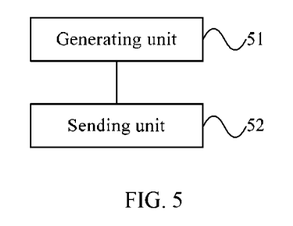
FIG. 5 is a schematic structural diagram of a user equipment according to another embodiment of the present invention.

FIG. 5 is a schematic structural diagram of a user equipment according to another embodiment of the present invention, as shown in FIG. 5, the user equipment in this embodiment can include a generating unit 51 and a sending unit 52. Particularly, the generating unit 51 is configured to generate a service state report; the sending unit 52 is configured to send the service state report to an access network device, so that the access network device can allocate an air interface resource for the user equipment according to the service state report.

Figure 6:
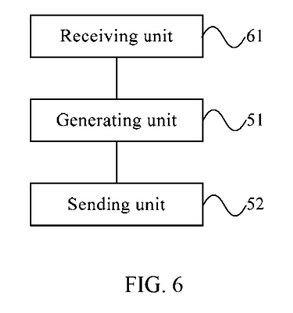
FIG. 6 is a schematic structural diagram of a user equipment according to another embodiment of the present invention.

In an optional implementation of this embodiment, as shown in FIG. 6, the user equipment in this embodiment also can further include a receiving unit 61, configured to receive event triggering information or sending period information of the service state report sent by the access network device; correspondingly, the generating unit 51 specifically can generate the service state report when a condition indicated by the event triggering information is satisfied or a period indicated by the sending period information arrives.

In an optional implementation of this embodiment, the receiving unit 61 also can further receive granularity information of the service state report sent by the access network device; correspondingly, the generating unit 51 specifically can generate a service state report corresponding to the granularity information. For example, the service state report can be configured according to a granularity of a video media, that is, to report service state information of a certain video media; or can be configured according to a granularity of a video session, that is, to report service state information of the video in one video session; or can be configured according to a granularity of a bearer, that is, to report service state information of the video in one bearer.

It should be noted that, the service state report can include, but is not limited to, at least one of the following: the number of video quality conversion times, video play code rate, video play frame delay, packet loss ratio, video play frame rate, video play frame rate deviation, video play waiting time, re-buffering waiting time/the number of re-buffering waiting times, time interval between request sending and response receiving, average throughput of video service data, buffered data amount or level corresponding to the buffered data amount, buffer play time length or level corresponding to the buffer play time length, and video configuration file information.

It should be noted that, the service state report can include, but is not limited to, at least one of the following:

indication information for indicating video quality conversion event occurring;

indication information for indicating video play code rate event occurring;

indication information for indicating video play frame delay event occurring;

indication information for indicating packet loss ratio event occurring;

indication information for indicating video play frame rate event occurring;

indication information for indicating video play frame rate deviation event occurring;

indication information for indicating video play waiting event occurring;

indication information for indicating video play re-buffering event occurring;

indication information for indicating transmission delay event occurring;

indication information for indicating average throughput of video service data event occurring;

indication information for indicating buffered data amount event occurring; and indication information for indicating buffer play time event occurring.

In an optional implementation of this embodiment, the event triggering information of the service state report can be configured as multiple forms, and reference for the detailed description can be made to relevant content in the embodiments corresponding to FIG. 1 and FIG. 2, which will not be repeated here.

In an optional implementation of this embodiment, video viewing time of the user can be further divided into multiple time periods, so that the UE can respectively perform statistics on the service state information within one time period, so as to generate a service state report. Optionally, the service state report further can include time information, such as the length of the time period or starting time and ending time of the time period, etc.

In this embodiment, the user equipment generates a service state report via the generating unit, and sends the service state report via the sending unit to the access network device, so that the access network device can allocate the air interface resource for the UE according to the service state report, and thus being capable of solving the problem in the prior art that a method for allocating an air interface resource can provide transmission guarantee only for downlink service data on the air interface. By means of the technical solutions provided in the present invention, the end-to-end transmission guarantee between a service server and a UE can be provided for the downlink service data, thereby improving the service quality of the end-to-end transmission.

Persons skilled in the art can clearly know that, for convenience and brevity of description, the detailed working procedures of the systems, devices and units described above can be deduced effortlessly from the corresponding procedures in the method embodiments, and will not be repeated here.

Understandably, in the embodiments described herein, the disclosed systems, devices and methods may be implemented in other modes. For example, the device embodiments above are illustrative in nature, and the units of the device are defined from the perspective of logical functions only and may be defined in a different way in practical application. For example, multiple units or components may be combined or integrated into another system, or some features may be ignored or not executed. Besides, the mutual coupling, direct coupling or communication connection illustrated or discussed herein may be implemented through some interfaces, the indirect coupling or communication connection between devices or units may be electrical, mechanical, or in other forms.

The units described as stand-alone components above may be separated physically or not; and the components illustrated as units may be physical units or not, namely, they may be located in one place, or distributed on multiple network elements. Some or all of the units described above may be selected as required to fulfill the objectives of the technical solutions of the present invention.

Besides, all functional units in the embodiments of the present invention may be physically stand-alone, or integrated into a processing module, or two or more of the units are integrated into one unit. The integrated unit above can be implemented in hardware, or in a combination of hardware and software function units.

The integrated unit above implemented as a software function unit can be stored in a computer-readable storage medium. The software function unit above is stored in a storage medium and includes several instructions causing a computer device (for example, a personal computer, a server, or a network device, etc.) to execute part of the steps of the method according to various embodiments of the present invention. The storage medium includes various medium capable of storing program codes, such as a USB flash disk, a mobile hard disk, a read-only memory (ROM for short), a random access memory (RAM for short), a magnetic disk, or an optical disk, or etc.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to some technical features in the technical solutions; however, such modifications or replacements do not cause the essence of corresponding technical solutions to depart from the spirit and scope of the embodiments of the present invention.

What is claimed is:

1. A method for allocating an air interface resource, comprising:

generating, by an access network device, event triggering information or sending period information of a service state report;

sending, by the access network device, the event triggering information or the sending period information to a user equipment, to enable the user equipment to send the service state report to the access network device when a condition indicated by the event triggering information is satisfied or a period indicated by the sending period information arrives;

receiving, by the access network device, the service state report sent by the user equipment;

allocating, by the access network device, the air interface resource for the user equipment according to the service state report;

wherein the generating, by the access network device, the event triggering information or the sending period information of the service state report, comprises:

generating, by the access network device, the event triggering information or the sending period information of the service state report according to at least one of: a service type of a service used, being used, or to be used by the user equipment; a transmission mechanism adopted by the service type; a service data generating manner of the service type; and a Quality of Service (QoS) parameter corresponding to the service data;

wherein the event triggering information comprises at least one of the following: a threshold for the number of video quality conversion times, triggering condition information for a video play code rate event, triggering condition information for a video play frame delay event, triggering condition information for a packet loss ratio event, triggering condition information for a video play frame rate event, triggering condition information for a video play frame rate deviation event, triggering condition information for a video play waiting event, triggering condition information for a re-buffering event, triggering condition information for a transmission delay event, triggering condition information for an average throughput of video service data event, and triggering condition information for a buffer play time event;

wherein the service state report comprises at least one of the following: a quantity of video quality conversion times, a video play code rate, video play frame delay, a packet loss ratio, a video play frame rate, video play frame rate deviation, a video play waiting time, one or more of a re-buffering waiting time and a quantity of re-buffering waiting times, time interval between request sending and response receiving, average throughput of video service data, a buffer play time length or level corresponding to the buffer play time length, and video configuration file information.

2. The method according to claim 1, wherein before the receiving, by the access network device, the service state report sent by the user equipment, the method further comprises:
generating, by the access network device, granularity information of the service state report; and
sending, by the access network device, the granularity information to the user equipment, to enable the user equipment to send a service state report corresponding to the granularity information to the access network device.

3. The method according to claim 1, wherein the event triggering information further comprises triggering condition information for the buffered data amount event, and the service state report further comprises a buffered data amount or level corresponding to the buffered data amount.

4. The method according to claim 1, wherein the service state report comprises at least one of the following:
indication information for indicating video quality conversion event occurring;
indication information for indicating video play code rate event occurring;
indication information for indicating video play frame delay event occurring;
indication information for indicating packet loss ratio event occurring;
indication information for indicating video play frame rate event occurring;
indication information for indicating video play frame rate deviation event occurring;
indication information for indicating video play waiting event occurring;
indication information for indicating video play re-buffering event occurring;
indication information for indicating transmission delay event occurring;
indication information for indicating average throughput of video service data event occurring;
indication information for indicating buffered data amount event occurring; and
indication information for indicating buffer play time event occurring.

5. The method according to claim 3, wherein the service state report further comprises time information.

6. A method for allocating an air interface resource, comprising:
receiving, by a user equipment, event triggering information or sending period information of a service state report sent by an access network device;
generating, by the user equipment, the service state report when a condition indicated by the event triggering information is satisfied or a period indicated by the sending period information arrives; and
sending, by the user equipment, the service state report to the access network device, to enable the access network device to allocate the air interface resource for the user equipment according to the service state report;
wherein the event triggering information or the sending period information of the service state report is generated by the access network device according to at least one of: a service type of a service used, being used, or to be used by the user equipment; a transmission mechanism adopted by the service type; a service data generating manner of the service type; and a Quality of Service (QoS) parameter corresponding to the service data;
wherein the event triggering information comprises at least one of the following: a threshold for the number of video quality conversion times, triggering condition information for a video play code rate event, triggering condition information for a video play frame delay event, triggering condition information for a packet loss ratio event, triggering condition information for a video play frame rate event, triggering condition information for a video play frame rate deviation event, triggering condition information for a video play waiting event, triggering condition information for a re-buffering event, triggering condition information for a transmission delay event, triggering condition information for an average throughput of video service data event, and triggering condition information for a buffer play time event;
wherein the service state report comprises at least one of the following: a quantity of video quality conversion times, a video play code rate, video play frame delay, a packet loss ratio, a video play frame rate, video play frame rate deviation, a video play waiting time, one or more of a re-buffering waiting time and a quantity of re-buffering waiting times, time interval between request sending and response receiving, average throughput of video service data, a buffer play time length or level corresponding to the buffer play time length, and video configuration file information.

7. The method according to claim 6, wherein:
before the generating, by the user equipment, the service state report, the method further comprises: receiving, by the user equipment, granularity information of the service state report sent by the access network device;
the generating, by the user equipment, the service state report, comprises:
generating, by the user equipment, the service state report corresponding to the granularity information.

8. The method according to claim 6, wherein the event triggering information further comprises triggering condition information for the buffered data amount event, and the service state report further comprises buffered data amount or level corresponding to the buffered data amount.

9. The method according to claim 6, wherein the service state report comprises at least one of the following:
indication information for indicating video quality conversion event occurring;
indication information for indicating video play code rate event occurring;
indication information for indicating video play frame delay event occurring;
indication information for indicating packet loss ratio event occurring;
indication information for indicating video play frame rate event occurring;
indication information for indicating video play frame rate deviation event occurring;
indication information for indicating video play waiting event occurring;
indication information for indicating video play re-buffering event occurring;
indication information for indicating transmission delay event occurring;
indication information for indicating average throughput of video service data event occurring;

indication information for indicating buffered data amount event occurring; and indication information for indicating buffer play time event occurring.

10. The method according to claim 8, wherein the service state report further comprises time information.

11. An access network device, comprising a processor and a non-transitory processor-readable medium including processor-executable instructions executed by the processor to perform, on the access network device, operations comprising:

generating event triggering information or sending period information of a service state report;

sending the event triggering information or the sending period information to a user equipment, to enable the user equipment to send the service state report to the access network device when a condition indicated by the event triggering information is satisfied or a period indicated by the sending period information arrives;

receiving the service state report sent by the user equipment; and allocating an air interface resource for the user equipment according to the service state report;

wherein the generating the event triggering information or the sending period information of the service state report, comprises:

generating the event triggering information or the sending period information of the service state report according to at least one of: a service type of a service used, being used, or to be used by the user equipment; a transmission mechanism adopted by the service type; a service data generating manner of the service type; and a Quality of Service (QoS) parameter corresponding to the service data;

wherein the event triggering information comprises at least one of the following: a threshold for the number of video quality conversion times, triggering condition information for a video play code rate event, triggering condition information for a video play frame delay event, triggering condition information for a packet loss ratio event, triggering condition information for a video play frame rate event, triggering condition information for a video play frame rate deviation event, triggering condition information for a video play waiting event, triggering condition information for a re-buffering event, triggering condition information for a transmission delay event, triggering condition information for an average throughput of video service data event, and triggering condition information for a buffer play time event;

wherein the service state report comprises at least one of the following: a quantity of video quality conversion times, a video play code rate, video play frame delay, a packet loss ratio, a video play frame rate, video play frame rate deviation, a video play waiting time, one or more of a re-buffering waiting time and a quantity of re-buffering waiting times, time interval between request sending and response receiving, average throughput of video service data, a buffer play time length or level corresponding to the buffer play time length, and video configuration file information.

12. The access network device according to claim 11, wherein the operations further comprise:

generating granularity information of the service state report, and sending the granularity information to the user equipment, to enable the user equipment to send a service state report corresponding to the granularity information to the access network device.

13. The access network device according to claim 11, wherein the event triggering information further comprises triggering condition information for the buffered data amount event, and the service state report further comprises a buffered data amount or level corresponding to the buffered data amount.

14. The access network device according to claim 11, wherein the service state report comprises at least one of the following:

indication information for indicating video quality conversion event occurring;

indication information for indicating video play code rate event occurring;

indication information for indicating video play frame delay event occurring;

indication information for indicating packet loss ratio event occurring;

indication information for indicating video play frame rate event occurring;

indication information for indicating video play frame rate deviation event occurring;

indication information for indicating video play waiting event occurring;

indication information for indicating video play re-buffering event occurring;

indication information for indicating transmission delay event occurring;

indication information for indicating average throughput of video service data event occurring;

indication information for indicating buffered data amount event occurring; and indication information for indicating buffer play time event occurring.

15. The access network device according to claim 13, wherein the service state report further comprises time information.

16. A user equipment, comprising a processor and a non-transitory processor-readable medium including processor-executable instructions executed by the processor to perform, on the user equipment, operations comprising:

receiving event triggering information or sending period information of a service state report sent by an access network device;

generating a service state report when a condition indicated by the event triggering information is satisfied or a period indicated by the sending period information arrives; and sending the service state report to the access network device, to enable the access network device to allocate an air interface resource for the user equipment according to the service state report;

wherein the event triggering information or the sending period information of the service state report is generated by the access network device according to at least one of: a service type of a service used, being used, or to be used by the user equipment; a transmission mechanism adopted by the service type; a service data generating manner of the service type; and a Quality of Service (QoS) parameter corresponding to the service data;

wherein the event triggering information comprises at least one of the following: a threshold for the number of video quality conversion times, triggering condition information for a video play code rate event, triggering condition information for a video play frame delay event, triggering condition information for a packet loss ratio event, triggering condition information for a video play frame rate event, triggering condition information for a video play frame rate deviation event, triggering condition information for a video play waiting event, triggering condition information for a re-buffering event, triggering condition information for a transmission delay event, triggering condition information for an average throughput of video service data event, and triggering condition information for a buffer play time event;

wherein the service state report comprises at least one of the following: a quantity of video quality conversion times, a video play code rate, video play frame delay, a packet loss ratio, a video play frame rate, video play frame rate deviation, a video play waiting time, one or more of a re-buffering waiting time and a quantity of re-buffering waiting times, time interval between request sending and response receiving, average throughput of video service data, a buffer play time length or level corresponding to the buffer play time length, and video configuration file information.

17. The user equipment according to claim 16, wherein the event triggering information further comprises triggering condition information for the buffered data amount event, and the service state report further comprises a buffered data amount or level corresponding to the buffered data amount.

18. The user equipment according to claim 16, wherein the service state report comprises at least one of the following:
indication information for indicating video quality conversion event occurring;
indication information for indicating video play code rate event occurring;
indication information for indicating video play frame delay event occurring;
indication information for indicating packet loss ratio event occurring;
indication information for indicating video play frame rate event occurring;
indication information for indicating video play frame rate deviation event occurring;
indication information for indicating video play waiting event occurring;
indication information for indicating video play re-buffering event occurring;
indication information for indicating transmission delay event occurring;
indication information for indicating average throughput of video service data event occurring;
indication information for indicating buffered data amount event occurring; and
indication information for indicating buffer play time event occurring.

* * * * *